(12) United States Patent
Furusawa et al.

(10) Patent No.: US 6,685,223 B2
(45) Date of Patent: Feb. 3, 2004

(54) AIRBAG RELEASE AID

(75) Inventors: Takasi Furusawa, Tokyo (JP); Paresh S. Khandhadia, Troy, MI (US)

(73) Assignee: Automotive Systems Laboratory, Inc.

( * ) Notice: Subject to any disclaimer, the term of this patent is extended or adjusted under 35 U.S.C. 154(b) by 273 days.

(21) Appl. No.: 09/777,389

(22) Filed: Feb. 5, 2001

(65) Prior Publication Data

US 2001/0045249 A1 Nov. 29, 2001

Related U.S. Application Data

(60) Provisional application No. 60/180,230, filed on Feb. 4, 2000.

(51) Int. Cl.$^7$ .................................................. B60R 21/26
(52) U.S. Cl. ....................................... 280/741; 55/482.1
(58) Field of Search ................................ 280/736, 741, 280/742; 55/482, 482.1, 486, 525, 523; 261/104, 107; 149/108.4; 252/194

(56) References Cited

U.S. PATENT DOCUMENTS

| | | | | |
|---|---|---|---|---|
| 3,711,115 A | * | 1/1973 | Lohr | 280/736 |
| 3,733,180 A | * | 5/1973 | Heineck | 422/167 |
| 3,785,149 A | * | 1/1974 | Timmerman | 60/205 |
| 3,972,545 A | * | 8/1976 | Kirchoff et al. | 280/735 |
| 5,482,579 A | * | 1/1996 | Ochi et al. | 149/83 |
| 6,037,279 A | * | 3/2000 | Brookman et al. | 442/71 |
| 6,062,143 A | * | 5/2000 | Grace et al. | 102/530 |
| 6,076,468 A | * | 6/2000 | DiGiacomo et al. | 102/530 |
| 6,149,746 A | * | 11/2000 | Blomquist | 149/46 |

FOREIGN PATENT DOCUMENTS

JP  11-99900  * 4/1999

* cited by examiner

*Primary Examiner*—David R. Dunn
(74) *Attorney, Agent, or Firm*—Dinnin & Dunn, P.C.

(57) ABSTRACT

A solid propellant gas generator contains a bed of agglomerated or beaded hydrated gelatin. The gelatin/water bed is oriented such that at least substantially filtered combustion products are humidified by the water vapor as the filtered combustion products pass over the bed. Relative thereto, a method of improving the release and inflation of an airbag of a vehicle occupant protection system is also described. Humidification of at least substantially filtered combustion products results in a reduced pressure requirement to open and inflate a stored airbag in fluid communication with the gas generator.

7 Claims, 3 Drawing Sheets

AIRBAG RELEASE AID

CROSS-REFERENCE TO RELATED APPLICATIONS

This application claims the benefit of U.S. Provisional Application Ser. No. 60/180,230 filed on Feb. 4, 2000.

BACKGROUND OF THE INVENTION

The present invention relates generally to gas inflators for automotive passenger restraint systems, and more specifically, to an inflator having an improved restraint performance, a reduction in toxic gases, and an improved airbag release.

The composition of the gas stream emanating from an automobile airbag inflator is subject to strict requirements to avoid toxicity concerns. Generally, gas generators containing solid propellants produce unacceptable byproducts that must be removed from the gas stream prior to exiting the gas generator. Due to the high combustion temperatures of solid propellants, many of the unacceptable byproducts are in the form of liquids or gases. Liquids and gases are difficult to remove unless cooled to form filterable solids upon contact with the relatively cooler surfaces of the gas generator.

The conventional approach to solving the aforesaid problem has been to direct the hot propellant gases directly into a coolant/filter mass and rapidly cool the gases down in a single step to the point where the undesirable solid liquid byproducts are removed. However, a problem is presented by this approach in that rapid cooling of the gases may stabilize the gas combustion equilibrium in a manner that leads to unacceptably high levels of undesired gases.

For example, in airbag inflators, low levels of NO (nitrogen monoxide) and CO (carbon monoxide) in the effluent gases are mandated. When a stoichiometric propellant containing N, C and O is burned, the quantity of NO and CO produced is a function of the propellant combustion temperature. More CO and NO is formed at higher temperatures. If, as in a conventional system, the combustion gases are quenched in a single step to a temperature at which the gas reaction rates are reduced to essentially zero, incomplete combustion often results. Accordingly, correspondingly unacceptable high CO and NO levels may result given the combustion temperature equilibrium condition of these gaseous species.

As a solution to the problems described, multistage cooling filters have been designed. However, inefficient heat transfer and filter clogging are concerns still driving improvements in filter design.

Yet another problem involves the release of the airbag once the gas exits the inflator and begins to fill the airbag. The airbag must be timely released to ensure adequate occupant protection. At times, the airbag may not fully inflate resulting in less than optimum protection of the occupant. Therefore, an inflator incorporating a module opening aid would be an improvement in the art.

SUMMARY OF THE INVENTION

The aforesaid problems are solved, in accordance with a preferred embodiment of the present invention, by a gas generator or airbag inflator comprising a plurality of beads containing gel and water disposed around a propellant chamber of a conventional gas inflator. The plurality of beads operates, in conjunction with a primary expanded metal filter, as a secondary filter and heat sink, and, as an airbag release agent. By cooling the propellant combustion gases in stages and providing sufficient residence time within the generator, the CO and NO equilibrium conditions are shifted to relatively low, acceptable, CO and NO concentrations. At the same time, humidification or introduction of water vapor (released from the gelatin/water matrix) to substantially filtered combustion products reduces the pressure required to release and inflate an airbag in fluid communication with the inflator.

DETAILED DESCRIPTION OF THE PREFERRED EMBODIMENT(S)

Figure 1:
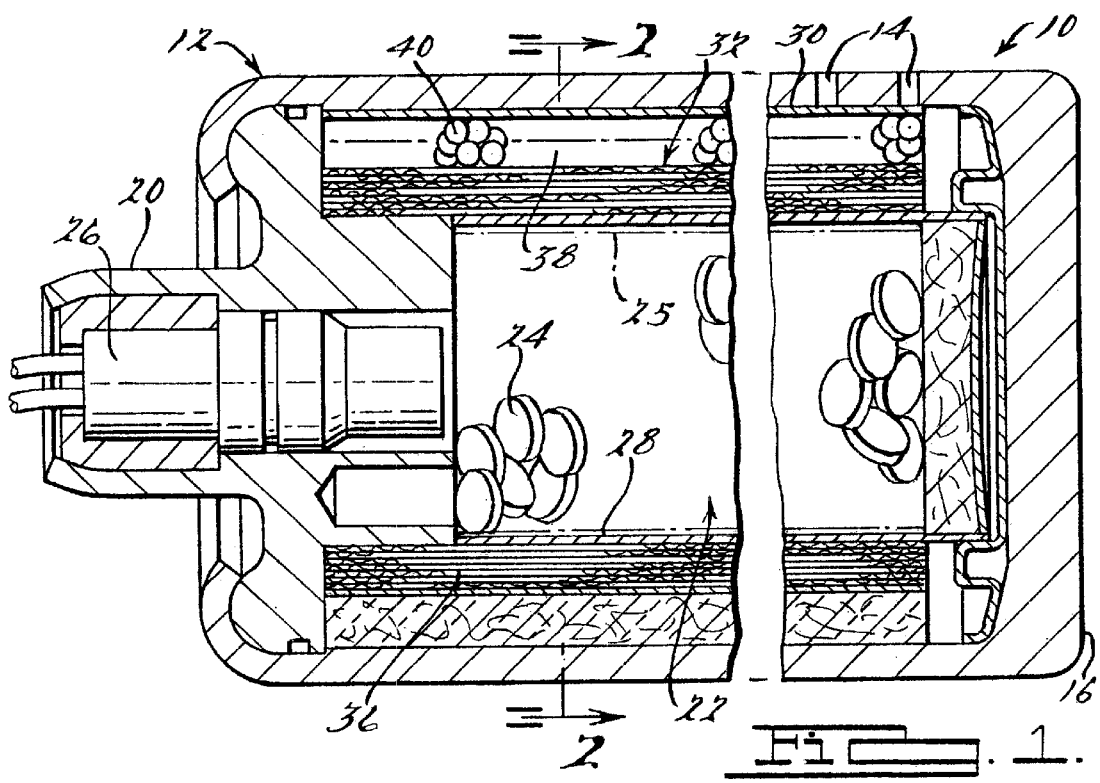
FIG. 1 is a cross-sectional view of a gas generator in accordance with the present invention.

As seen in the drawings, a gas generator 10, in accordance with an exemplary constructed embodiment of the invention, comprises a housing 12, for example, an aluminum forging. The housing 12 is provided with a plurality of gas discharge nozzles 14, arranged in two circumferentially and homolaterally extending rows, and spaced apart approximately 180° relative to one another. The housing 12 has an integral end closure 16 at one end and an end closure 20 at the opposite end that is crimped in place. A perforated propellant chamber 22 is centrally and longitudinally disposed within the housing 12 for containment of propellant grains 24.

The inside of the propellant chamber 22 may be provided with a burst foil covering the perforated portions of chamber 22, which facilitates pressure buildup and flame front propagation through the propellant grains 24. The end closure 20 accepts an electrical squib 26 wherein the squib 26 facilitates electric ignition of propellant grains 24. The propellant chamber 22 is surrounded by a first filter screen 28 comprising stainless steel.

A baffle tube 30, preferably aluminum, is telescoped about the propellant chamber 22 in radially spaced relation to the slagging screen 28 thereon and juxtaposed to the housing 12. A second filter screen 32, preferably aluminum, defines a first plenum 34 radially outward from the slagging screen 28. A wound expanded metal mesh 36 comprised of one or more layers of 16–20 mesh stainless steel wire having a wire diameter of 0.032 in. (≈0.08 cm.) fills the first plenum 34 and is radially constrained by second filter screen 32.

In accordance with the present invention, a second plenum 38 is formed between second filter screen 32 and baffle tube 30. A bed of gelatin/water beads 40, obtainable from Nippon Carbide in Tokyo, Japan as "DriWater" for example, fills plenum 38, and provides a heat sink and further filtering means.

The gelatin/water matrix within the beads 40 is simply a colloid in which the disperse phase is combined with the continuous phase to produce a viscous jelly-like product. Only 2% gelatin within a balance of water is required to form a stiff gel useful in forming the gelatinous beads. Although gelatinous beads are preferred, other forms of gelatin such as non-uniform agglomerations may also be used. In accordance with the present invention, gelatin is strongly hydrophilic, absorbing up to 10 times its weight of water and forming reversible gels of high strength and viscosity. In general, any gelatin is useful in the present invention thus including Type A gelatin (obtained from acid-treated raw materials) and Type B gelatin (obtained from alkali-treated raw materials). Gelatin is readily available off the shelf and may, for example, be purchased from any grocery store.

In the preferred gas generator shown in FIG. 1, ceramic filters 42, Unifrax #204LE for example, obtainable from Unifrax Corporation, Niagara, N.Y., are evenly and arcuately spaced about baffle tube 30, and are radially disposed about propellant chamber 22. In the embodiment shown in FIG. 2, two ceramic filters 42 are circumferentially orientated 180° from one another. However, if additional ceramic filters were desired, such as four different filters, the filters would then preferably be uniformly spaced 90° apart.

Figure 2:
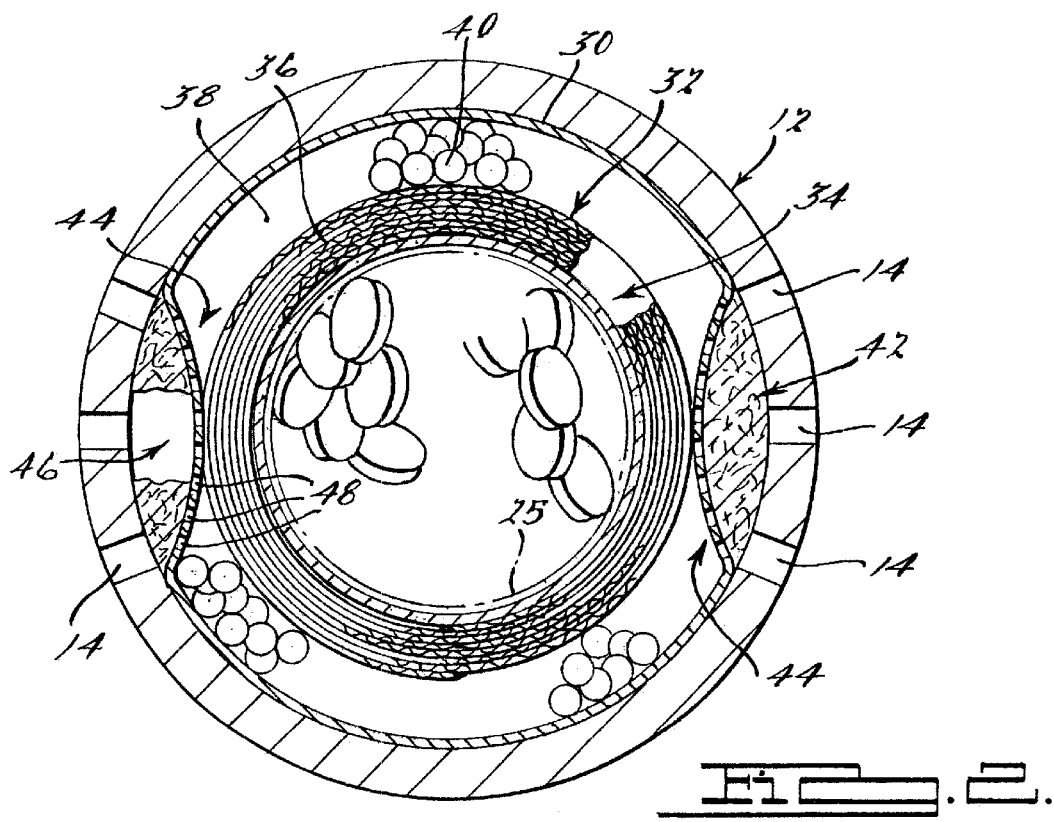
FIG. 2 is a cross-sectional view taken along the line 2—2 of FIG. 1.
Figure 3:
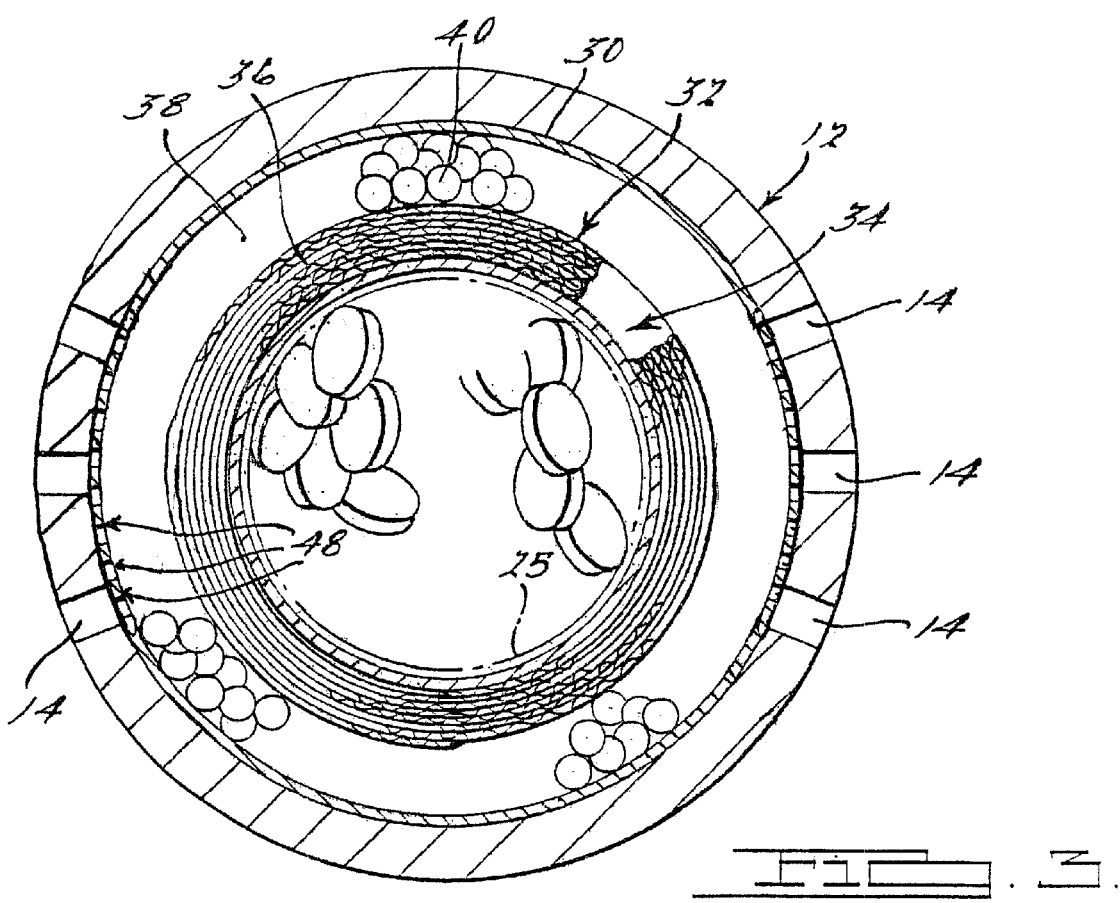
FIG. 3 is a cross-sectional view of a driver's side inflator having an outer chamber containing gelatin/water beads.

It should be noted that the ceramic filters shown in FIG. 2 are not required. As shown in FIG. 3, immediately prior to exiting the inflator, the beads 40 are the final heat sink/filtration stage for the combustion gases.

In the preferred embodiment however, arcuate edges 44 are formed where baffle tube 30 bows radially inward at the inner edge of each ceramic filter 42. Longitudinal concave cavities 46, formed between the housing 12 and the arcuate edges 44, provide for disposition of ceramic filters 42. A plurality of apertures 48 are evenly spaced along the arcuate edges 44 of baffle tube 30, thereby providing a gas flow path into the ceramic filters 42. The apertures 48 and the discharge nozzles 14 are positioned on inner and outer edges of ceramic filters 42, respectively, and provide for gaseous flow through and out the ceramic filters 42.

In operation, gases radially exiting from the propellant chamber 22 flow through the surrounding slagging screen 28 and enter the plenum 34 filled with wound expanded metal mesh 36. Both liquids and solids in the gas stream are cooled and deposited, or filtered, as the gas radially migrates through the metal mesh 36. The gases then radially flow through second filtering screen 32 into the beads 40 wherein the gases are further cooled and filtered. Thereafter, the gases flow circumferentially through the bed of beads 40 to the apertures 48 of baffle tube 30, thence radially outward through the apertures 48 in the baffle tube 30, thence outwardly through the ceramic filters 42 to radially exit through discharge nozzles 14 of housing 12. If the ceramic filters are not desired, then the humidified filtered combustion products would simply pass through baffle tube 30 and into an airbag in fluid communication therewith.

As the hot gas passes through the gelatin/water beads 40, water is released from the gelatin matrix. The water functions to lubricate the airbag opening resulting in improved restraint performance and a "break" in the airbag in approximately one third the pressure when compared to a similar inflator not employing the gelatin beads. The ideal airbag "break" is zero pressure. "Break" is defined as the point the airbag releases and begins to inflate. At least 0.1 moles to two moles of water, and more preferably about 1.0 moles of water should be contained within the gelatin for each mole of gas generant combusted, although smaller molar amounts of water would still provide somewhat of a benefit.

In essence, any known inflator may incorporate the use of gel so long as the gases entering any given gelatinous bed are substantially filtered prior to entry thereof. To illustrate, FIG. 3 presents a typical driver-side inflator wherein gases exiting the inflator enter a chamber formed about the circumference or periphery of the inflator. The chamber may contain a bed of agglomerated gelatin, or may contain gelatinous beads, for example so long as the gelatin is hydrated. The chamber may be die-cast or otherwise formed in an annular or donut shape, wherein an inner side contains a first plurality of holes for entry of the filtered gases. An outer side of the chamber contains a second plurality of orifices for exit of the "humidified" gases into an airbag (not shown).

Gas generants useful in conjunction with the present invention are gas generants well known to those of ordinary skill in the art. For example, see U.S. Pat. Nos. 5,035,757, 5,460,668, 5,756,929, and 5,872,329, herein incorporated by reference. These compositions exemplify, but do not limit, useful gas generant compositions.

Figure 4:
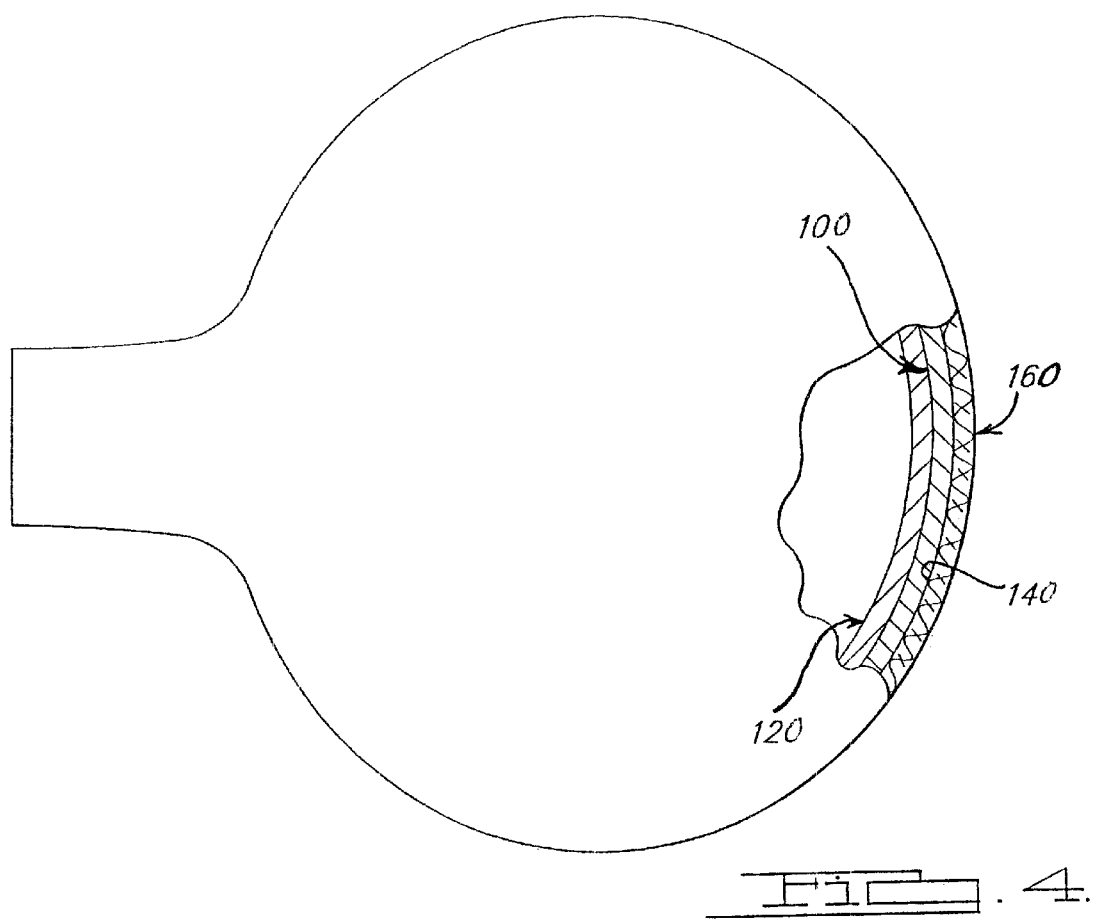
FIG. 4 is a cross-sectional view of an airbag containing a gelatinous coating.

Finally, in accordance with the present invention, other methods of introducing water to the at least substantially filtered gas stream are contemplated and include: injecting water or compressed water into the gas flowing from the inflator prior to entering the airbag; seeding the inside of the airbag with the gelatin/water beads; and/or coating the inside of an airbag 160 with a gelatin/water or hydrated gelatin coating 120 as shown in FIG. 4. Water thus evolves due to the heat of the gas as it passes over the beads or gelatin/water matrix.

Stated another way, applicants' contribution to the art consists of improving an airbag release by humidifying an at least substantially filtered gas stream produced by any known or state-of-the-art gas generator. By preferably releasing at least 0.1 to 2.0 moles of vaporous water for every mol of gas generant combusted, and more preferably 1.0 moles of water vapor per mole of gas generant combusted, applicants effect an improved release of the airbag at a lower pressure without increasing the nitrogen oxides (e.g. nitrogen monoxide and nitrogen dioxide). The resultant post-combustion air quality within the vehicle is thus improved, and furthermore, the force of the airbag deployment is also decreased given the reduction in "break" thereby enhancing occupant safety.

It should be appreciated that simply selecting gas generant compositions that produce vaporous water upon combustion will not satisfy the objects of the present invention. First, many compositions producing substantial amounts of water are inhibited by relatively low burn rates. Secondly, water produced during combustion often combines with combustion solids to form slag within the filter. Therefore, the water required to reduce the "break" within the airbag is simply not provided after filtration of the combustion products.

In view of the above, one of ordinary skill will appreciate that the structure and/or operating characteristics of the inflator described herein are not critical to the invention so long as the gas generated is substantially filtered. The only critical limitation is that vaporized or liquid water be introduced to a pre-filtered or at least substantially filtered flow of gas combustion products.

Therefore, other inflator designs well known to those of ordinary skill are also contemplated as useful in the context of the present invention. For example, see U.S. Pat. Nos. 5,622,380, 5,628,528, 5,727,813, 5,806,888 and 5,934,705, herein incorporated by reference. These inflators exemplify, but do not limit, typical inflators useful in the context of the present invention. In essence, a chamber containing a gelatinous bed can be customized to fit within or about any inflator design and thus provide a benefit by retrofitting any given inflator.

Alternatively, as shown in FIG. 4, any given inflator may incorporate the gelatin/water matrix as a coating or compound within an airbag in fluid communication with the inflator.

While the foregoing examples illustrate and describe the use of the present invention, they are not intended to limit the invention as disclosed in certain preferred embodiments herein. Therefore, variations and modifications commensurate with the above teachings and the skill and/or knowledge of the relevant art, are within the scope of the present invention.

We claim:

1. A gas generator comprising:

a housing having a plurality of gas discharge nozzles;

a propellant chamber located within said housing for holding a propellant charge, said chamber having a plurality of apertures therein;

an initiator for igniting said propellant charge;

a filter in fluid communication with said plurality of apertures and said plurality of gas discharge nozzles for filtering combustion products of said propellant charge; and a bed of hydrated gelatin containing about 0.1 to 2.0 mols of water per mol of propellant charge fluidly communicating with said filter and said gas discharge nozzles, wherein gases produced by ignition of said propellant charge flow through said plurality of apertures into said filter, thence through said bed of hydrated gelatin, thence outward through said discharge nozzles in said housing.

2. The gas generator of claim 1 wherein said hydrated gelatin is a gelatin/water mixture contained in a plurality of gelatinous beads.

3. The gas generator of claim 1 wherein said hydrated gelatin is an agglomeration of randomly shaped gelatin.

4. A method of improving a release and inflation of an airbag comprising the steps of:

igniting a gas generant composition within a gas generator to form combustion products;

at least substantially filtering the combustion products to form filtered combustion products;

passing the filtered combustion products over a bed of hydrated gelatin containing about 0.1 to 2.0 mols of water for every mol of gas generant composition combusted, to form humidified filtered combustion products; and routing the humidified filtered combustion products into the airbag.

5. The method of claim 4 wherein said hydrated gelatin contains about 1.0 mol of water per mol of gas generant composition.

6. A method of improving a release and inflation of an airbag comprising the steps of:

igniting a gas generant composition within a gas generator to form combustion products;

at least substantially filtering the combustion products to form filtered combustion products;

humidifying the filtered combustion products by passing the filtered combustion products over a bed of hydrated gelatin to form humidified filtered combustion products; and routing the humidified filtered combustion products into the airbag.

7. A method of improving a release and inflation of an airbag comprising the steps of:

igniting a gas generant composition within a gas generator to form combustion products;

at least substantially filtering the combustion products to form filtered combustion products;

humidifying the filtered combustion products to form humidified filtered combustion products; and routing the humidified filtered combustion products into the airbag, wherein the humidifying and routing steps comprise routing the filtered combustion products into an airbag coated with gelatin to form humidified filtered combustion products.

* * * * *